(12) United States Patent
Jung et al.

(10) Patent No.: US 8,514,270 B2
(45) Date of Patent: Aug. 20, 2013

(54) LIQUID CRYSTAL DISPLAY

(75) Inventors: Mee-Hye Jung, Suwon-si (KR); Chong-Chul Chai, Seoul (KR); Yong-Woo Lee, Seoul (KR); Young-Gu Kim, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/437,611

(22) Filed: Apr. 2, 2012

(65) Prior Publication Data
US 2012/0188477 A1 Jul. 26, 2012

Related U.S. Application Data

(63) Continuation of application No. 12/775,196, filed on May 6, 2010, now Pat. No. 8,169,582, which is a continuation of application No. 12/143,129, filed on Jun. 20, 2008, now Pat. No. 8,111,341.

(30) Foreign Application Priority Data

Jan. 29, 2008 (KR) ........................ 10-2008-0008999

(51) Int. Cl.
*G02F 1/136* (2006.01)
(52) U.S. Cl.
USPC ................ 348/48; 349/39; 349/129; 349/144
(58) Field of Classification Search
USPC .................................... 349/48, 144
See application file for complete search history.

(56) References Cited

U.S. PATENT DOCUMENTS

| 5,459,596 | A | 10/1995 | Ueda et al. |
| 5,726,727 | A | 3/1998 | Shibahara et al. |
| 6,025,900 | A | 2/2000 | Yoon et al. |
| 6,268,897 | B1 | 7/2001 | Kim et al. |
| 6,292,244 | B1 | 9/2001 | Kuo et al. |
| 6,512,564 | B1 | 1/2003 | Yoshida et al. |
| 6,894,734 | B1 | 5/2005 | Ihara |

(Continued)

FOREIGN PATENT DOCUMENTS

| WO | 2006/132369 | 12/2006 |
| WO | 2007-091365 | 8/2007 |
| WO | 2007-114471 | 10/2007 |
| WO | 2007-123244 | 11/2007 |

OTHER PUBLICATIONS

Non-Final Office Action dated Jan. 4, 2010 issued for U.S. Appl. No. 12/143,129.
Final Office Action dated Jul. 2, 2010 issued for U.S. Appl. No. 12/143,129.
Non-Final Office Action dated Aug. 23, 2010 issued for U.S. Appl. No. 12/775,196.

(Continued)

*Primary Examiner* — Richard Kim
(74) *Attorney, Agent, or Firm* — H.C. Park & Associates, PLC

(57) ABSTRACT

A liquid crystal display includes a first substrate and a second substrate facing each other, a pixel electrode disposed on the first substrate and including a first sub-pixel electrode and a second sub-pixel electrode spaced apart from the first sub-pixel electrode by a gap, a common electrode disposed on the second substrate, a shielding member disposed on the first substrate or the second substrate and overlapping the gap between the first sub-pixel electrode and the second sub-pixel electrode, an alignment layer disposed on at least one of the pixel electrode and the common electrode, and a liquid crystal layer disposed between the first substrate and the second substrate.

20 Claims, 17 Drawing Sheets

(56) References Cited

U.S. PATENT DOCUMENTS

| | | |
|---|---|---|
| 6,980,262 B2 | 12/2005 | Song |
| 7,139,057 B2 | 11/2006 | Lee |
| 7,468,772 B2 | 12/2008 | Yoshida et al. |
| 7,511,789 B2 | 3/2009 | Inoue et al. |
| 7,548,285 B2 | 6/2009 | Su et al. |
| 7,586,574 B2 | 9/2009 | Tacuchi |
| 7,656,486 B2 | 2/2010 | Tasaka et al. |
| 2005/0248700 A1 | 11/2005 | Takagi et al. |
| 2006/0103800 A1 | 5/2006 | Li et al. |
| 2007/0019120 A1 | 1/2007 | Tasaka et al. |
| 2009/0279034 A1 | 11/2009 | Shoraku et al. |

OTHER PUBLICATIONS

Final Office Action dated Feb. 23, 2011 issued for U.S. Appl. No. 12/775,196.

Non-Final Office Action dated May 31, 2011 issued for U.S. Appl. No. 12/775,196.

Non-Final Office Action dated Jul. 14, 2011 issued for U.S. Appl. No. 12/143,129.

Notice of Allowance dated Sep. 29, 2011 issued for U.S. Appl. No. 12/143,129.

Final Office Action dated Nov. 1, 2011 issued for U.S. Appl. No. 12/775,196.

Notice of Allowance dated Jan. 19, 2012 issued for U.S. Appl. No. 12/775,196.

(a)　　　　　　　　　　　(b)

(a)

(b)

LIQUID CRYSTAL DISPLAY

CROSS-REFERENCE TO RELATED APPLICATIONS

This application is a continuation of U.S. patent application Ser. No. 12/775,196, filed on May 6, 2010, which is a continuation of U.S. patent application Ser. No. 12/143,129, filed on Jun. 20, 2008 and now issued as U.S. Pat. No. 8,111,341 and claims priority from and the benefit of Korean Patent Application No. 10-2008-0008999, filed on Jan. 29, 2008, which is hereby incorporated by reference for all purposes as if fully set forth herein.

BACKGROUND

1. Field

Exemplary embodiments of the present invention relate to a liquid crystal display.

2. Discussion of the Background

Liquid crystal displays (LCDs) are one of the most widely used flat panel is displays, and an LCD includes a pair of panels provided with field-generating electrodes, such as pixel electrodes and a common electrode, and a liquid crystal (LC) layer disposed between the two panels. The LCD displays images when voltages are applied to the field-generating electrodes to generate an electric field in the LC layer that determines the orientations of LC molecules therein to adjust polarization of incident light.

In a vertical alignment (VA) mode LCD, the longitudinal axes of the LC molecules are perpendicular to the upper and lower panels in the absence of an electric field, and thus, the contrast ratio may be large and the reference viewing angle may be wide.

In the VA mode LCD, to obtain a wide viewing angle a plurality of domains in which the alignment directions of the LC molecules are different from each other may be formed in one pixel.

To achieve this, at least one cutout may be formed in at least one field generating electrode. In this method, the plurality of domains may be formed by aligning the LC molecules vertically with respect to the fringe field generated between the edges of the cutout and the field generating electrodes facing the edges.

However, the aperture ratio may be decreased in this structure. Also, the LC molecules disposed near the cutouts may be easily aligned vertically with respect to the fringe field, but the LC molecules disposed in the central portions of the domains, which are far from the cutouts, may generate a random motion such that the response speed becomes slow. Moreover, a domain of the reverse direction may be formed, thereby causing an instant afterimage to appear.

Alternatively, the alignment direction of the LC molecules and the alignment angle may be controlled by irradiating light onto the alignment layer. In this light alignment method, it may not be necessary to form the cutouts in the field generating electrodes so the aperture ratio may be increased and the response time of the LC molecules may be improved by a pre-tilt angle generated during the light alignment.

On the other hand, the VA mode LCD may have lower side visibility than front visibility, and, to solve this problem, one pixel may be divided into two sub-pixels, and different voltages be applied to the sub-pixels.

However, when the light alignment method is adapted to a structure having two sub-pixels, the alignment direction of LC molecules subjected to the light alignment may be different from the alignment direction of the LC molecules generated by the fringe field in a gap between two sub-pixels of the LCD so that texture may be generated in the corresponding portion. The texture may decrease transmittance and appear as a stain such that the display characteristics may be deteriorated.

SUMMARY OF THE INVENTION

Exemplary embodiments of the present invention provide a liquid crystal display (LCD) in which one pixel is divided into two sub-pixels, and the generation of texture due to a light alignment method may be reduced.

Additional features of the invention will be set forth in the description which follows, and in part will be apparent from the description, or may be learned by practice of the invention.

An exemplary embodiment of the present invention discloses an LCD including a first substrate and a second substrate facing each other, a pixel electrode disposed on the first substrate and including a first sub-pixel electrode and a second sub-pixel electrode spaced apart is from the first sub-pixel electrode by a gap, a common electrode disposed on the second substrate, a shielding member disposed on the first substrate or the second substrate and overlapping the gap between the first sub-pixel electrode and the second sub-pixel electrode, an alignment layer disposed on at least one of the pixel electrode and the common electrode, and a liquid crystal (LC) layer disposed between the first substrate and the second substrate.

An exemplary embodiment of the present invention also discloses an LCD including a pixel electrode that includes a first sub-pixel electrode and a second sub-pixel electrode, a common electrode facing the pixel electrode, a first LC layer disposed between the first sub-pixel electrode and the common electrode, a second LC layer disposed between the second sub-pixel electrode and the common electrode, and a shielding member disposed under the pixel electrode or under the common electrode and overlapping a gap between the first sub-pixel electrode and the second sub-pixel electrode. The first LC layer includes a plurality of domains where liquid crystal molecules are aligned in a left-upper direction, a left-lower direction, a right-upper direction, and a right-lower direction, respectively, and the second LC layer includes a plurality of domains aligned in the left-upper direction, the left-lower direction, the right-upper direction, and the right-lower direction, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, is illustrate embodiments of the invention, and together with the description serve to explain the principles of the invention.

DETAILED DESCRIPTION OF THE ILLUSTRATED EMBODIMENTS

Figure 1:
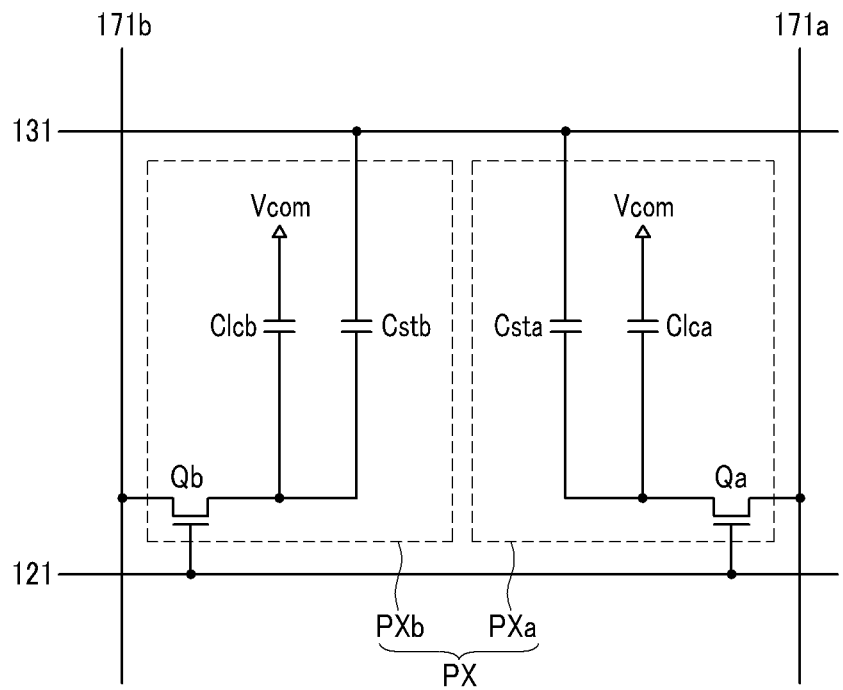
FIG. 1 is an equivalent circuit diagram of a pixel of an LCD according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Exemplary Embodiment 1

An LCD according to an exemplary embodiment of the present invention will be described in detail below with reference to FIG. 1, FIG. 2, FIG. 3, FIG. 4, and FIG. 5.

Figure 2:
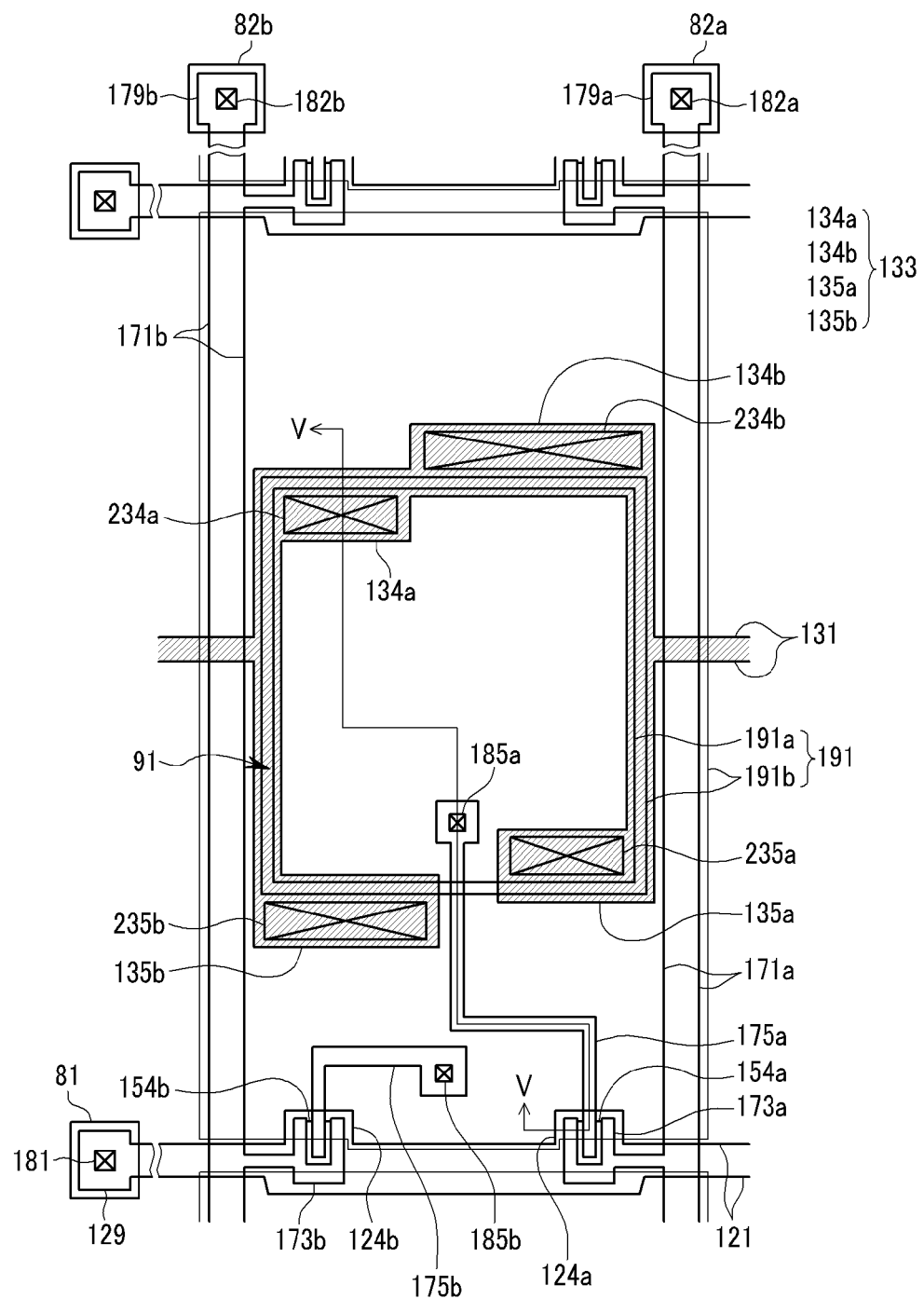
FIG. 2 is a layout view of an LCD according to an exemplary embodiment of the present invention.
Figure 3:
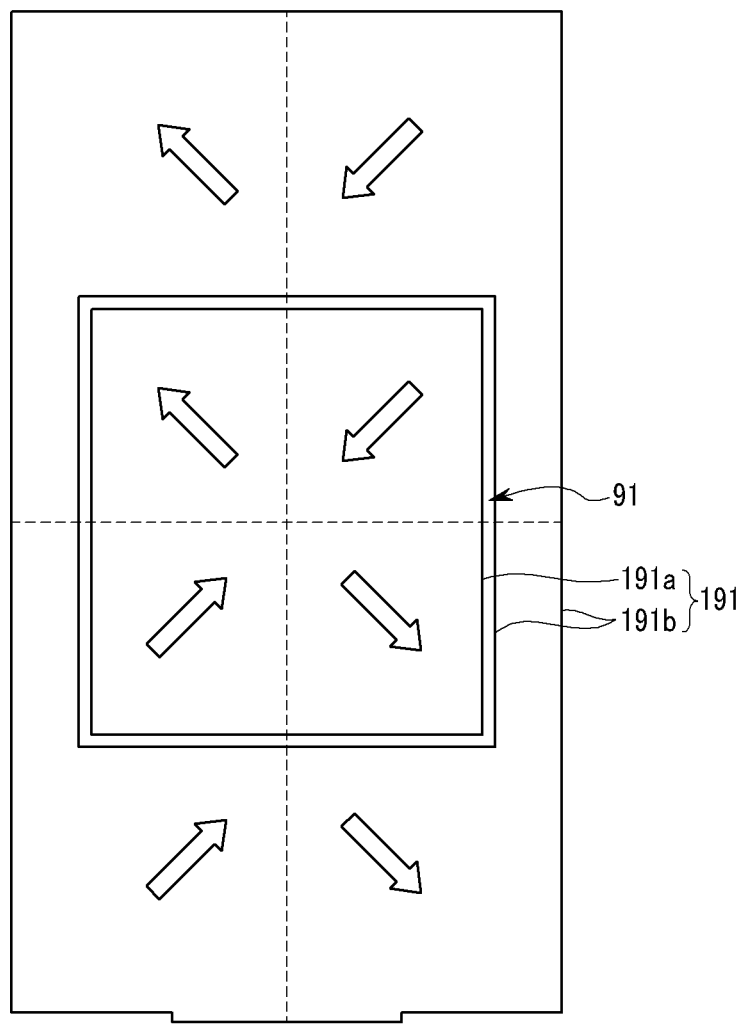
FIG. 3 and FIG. 4 are layout views respectively showing a pixel electrode and a gate conductor in the LCD shown in FIG. 2.
Figure 4:
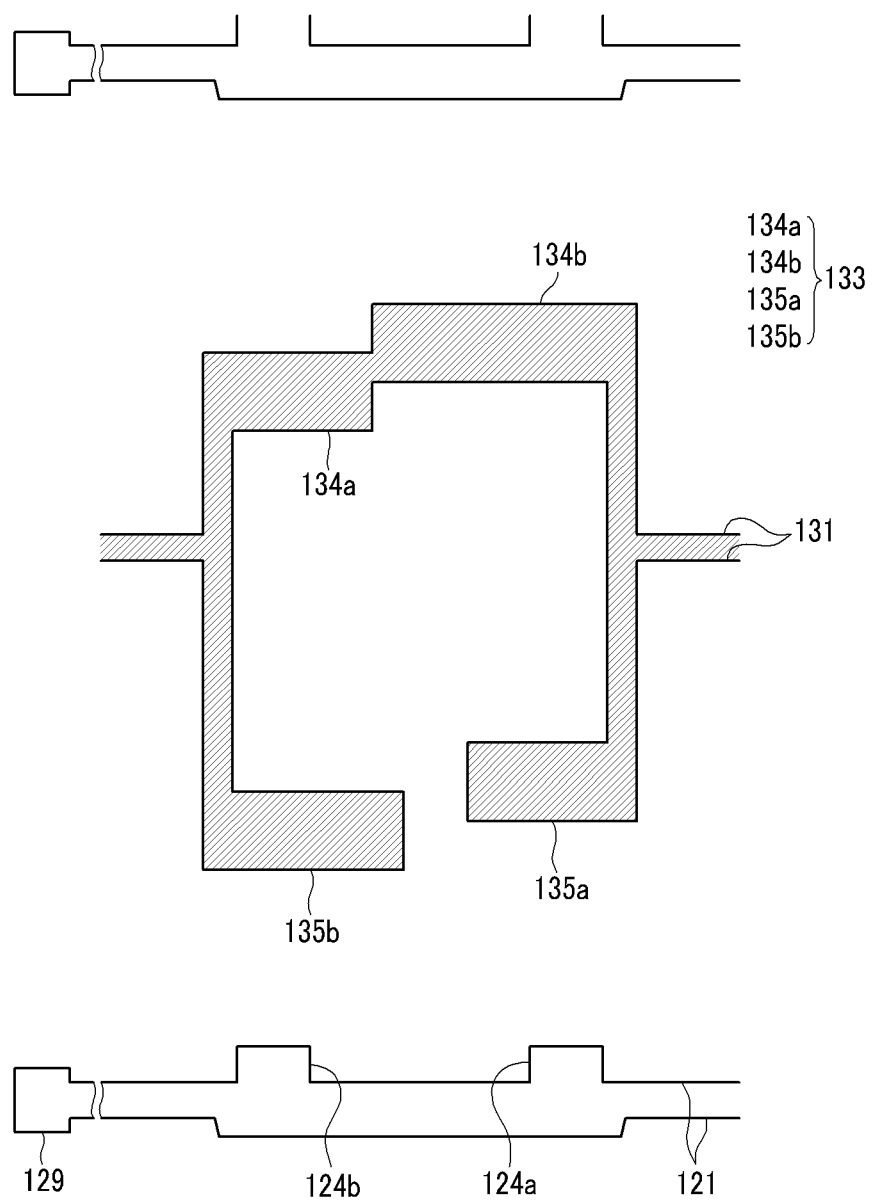
Figure 5:
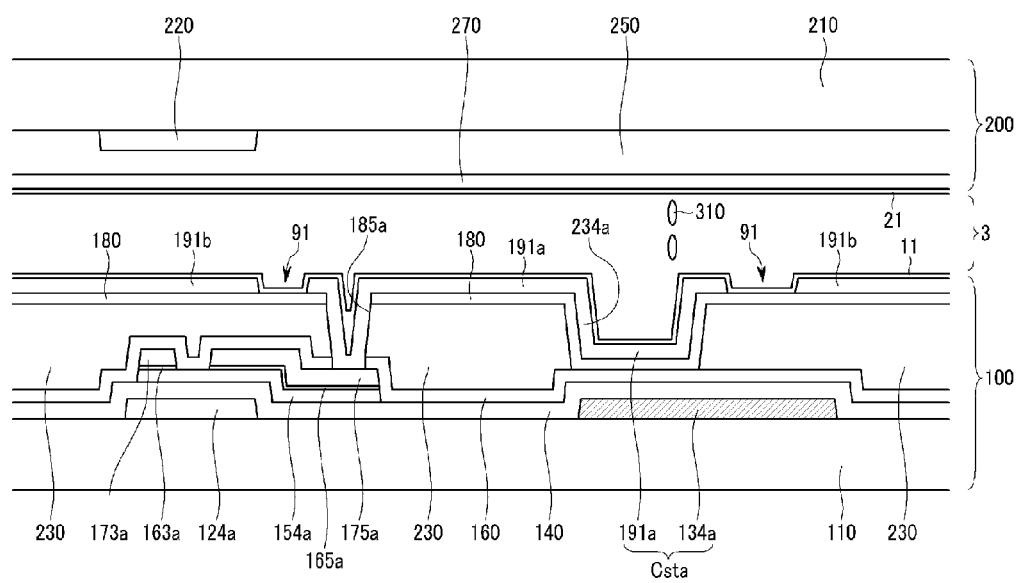
FIG. 5 is a cross-sectional view of the LCD taken along line V-V of FIG. 2.

FIG. 1 is an equivalent circuit diagram of one pixel of an LCD according to an exemplary embodiment of the present invention. FIG. 2 is a layout view of an LCD according to is an exemplary embodiment of the present invention, and FIG. 3 and FIG. 4 are layout views respectively showing a pixel electrode and a gate conductor in the LCD of FIG. 2. FIG. 5 is a cross-sectional view taken along line V-V of FIG. 2.

Referring to FIG. 1, each pixel PX includes a pair of sub-pixels PXa and PXb, and each sub-pixel PXa and PXb includes a switching element Qa and Qb connected to a gate line 121 and a corresponding data line 171a and 171b. LC capacitors Clca and Clcb connect to the switching elements Qa and Qb, and storage capacitors Csta and Cstb connect to the switching elements Qa and Qb and a storage electrode line 131.

Each switching element Qa and Qb may be a three terminal element including a control terminal, an input terminal, and an output terminal. The control terminal thereof is connected to the gate line 121; the input terminal is connected to the corresponding data line 171a and 171b, and the output terminal is connected to the LC capacitor Clca and Clcb and the storage capacitor Csta and Cstb.

The storage capacitors Csta and Cstb, which serve as auxiliaries to the LC capacitors Clca and Clcb, are formed where the storage electrode line 131 and the pixel electrode (not shown) overlap each other with an insulator disposed therebetween, and a set voltage such as a common voltage Vcom is applied to the storage electrode line 131. Also, the storage capacitors Csta and Cstb may be formed where the pixel electrode overlaps the immediately previous gate line with an insulator disposed therebetween.

Referring to FIG. 2, FIG. 3, FIG. 4, and FIG. 5, an LCD according to the present exemplary embodiment includes a thin film transistor array panel 100 and a common electrode panel 200, and an LC layer 3 disposed therebetween.

First, the thin film transistor array panel 100 will be described.

A gate conductor including a plurality of gate lines 121 and a plurality of storage electrode lines 131 are disposed on an insulation substrate 110.

The gate lines 121 transfer gate signals and extend mainly in a horizontal direction. Each gate line 121 includes a plurality of first and second gate electrodes 124a and 124b, which protrude upward, and a wide end portion 129.

The storage electrode lines 131 transfer a common voltage and extend mainly in a horizontal direction. Each storage electrode line 131 is disposed between two gate lines 121 and includes a plurality of storage electrodes 133.

Referring to FIG. 2 and FIG. 4, each storage electrode 133 may have a loop shape including upper, lower, right, and left portions. The upper portion of the storage electrode 133 includes expansions 134a and 134b that extend upward and downward, respectively, and are connected to each other. The lower portion of the storage electrode 133 includes expansions 135a and 135b that extend upward and downward, respectively, and are not connected to each other. A portion of the storage electrode 133 having the loop shape between the expansions 135a and 135b is removed. The upper and lower portions of the storage electrode 133 are wider than the right and left portions.

A gate insulating layer 140 is disposed on the gate line 121 and the storage electrode line 131.

A pair of first and second semiconductor stripes (not shown) is disposed on the gate insulating layer 140. The first and second semiconductor stripes extend mainly in a vertical direction. The first semiconductor stripe includes a first protrusion 154a protruding toward the first gate electrode 124a, and the second semiconductor stripe includes a second protrusion 154b protruding toward the second gate electrode 124b.

Ohmic contact stripes (not shown), first ohmic contact islands 165a, and second ohmic contact islands (not shown) are disposed on the semiconductor stripe. An ohmic contact stripe includes first protrusions 163a and second protrusions (not shown), and a first protrusion 163a and a first ohmic contact island 165a are disposed as a pair and face each other on a first protrusion 154a of the semiconductor stripe, and a second protrusion and a second ohmic contact island are disposed as a pair and face each other on a protrusion 154b of the semiconductor stripe.

First and second data lines 171a and 171b and first and second drain electrodes 175a and 175b are disposed on the ohmic contact stripe and the gate insulating layer 140.

The first and second data lines 171a and 171b transmit data voltages and extend in a vertical direction, thereby crossing the gate lines 121 and storage electrode lines 131. The first data line 171a includes first source electrodes 173a extending toward the first gate electrodes 124a and an end portion 179a having a wide area. The second data line 171b includes second source electrodes 173b extending toward the second gate electrodes 124b and an end portion 179b having a wide area. The first data line 171a and the second data line 171b may receive different voltages.

The first drain electrode 175a is opposite to the first source electrode 173a with respect to the first gate electrode 124a, and the second drain electrode 175b is opposite to the second source electrode 173b with respect to the second gate electrode 124b. The end portions of the first and second drain electrodes 175a and 175b are partially enclosed by the curved portion of the first and second source electrodes 173a and 173b.

The semiconductor stripe may have substantially the same plane shape as the first and second data lines 171a and 171b and the first and second drain electrodes 175a and 175b is except for the channel regions between the first source electrode 173a and the first drain electrode 175a and the channel region between the second source electrode 173b and the second drain electrode 175b.

The ohmic contact stripe is disposed between the semiconductor stripe and the first and second data lines 171a and 171b and may have substantially the same plane shape as the first and second data lines 171a and 171b. The first and second ohmic contact islands are disposed between the semiconductor stripe and the first and second drain electrodes 175a and 175b and may have substantially the same plane shape as the first and second drain electrodes 175a and 175b.

A blocking layer 160, which may be made of an inorganic insulating material such as silicon nitride ($SiN_x$) or silicon oxide ($SiO_2$), is disposed on the first and second data lines 171a and 171b and the first and second drain electrodes 175a and 175b, and a color filter 230 is disposed thereon.

The color filter 230 may be a red filter, a green filter, or a blue filter that extends in a direction parallel to the first and second data lines 171a and 171b along the pixels in a column. Pixels having red filters, pixels having green filters, and pixels having blue filters may be alternately arranged.

The color filter 230 includes a plurality of openings 234a, 234b, 235a, and 235b. The openings 234a, 234b, 235a, and 235b overlap the expansions 134a, 134b, 135a, and 135b, respectively, of the storage electrode 133.

A passivation layer 180 is disposed on the color filter 230. The passivation layer 180 may be made of an inorganic insulating material, such as silicon nitride or silicon oxide, which may prevent the color filter 230 from lifting and may prevent a chemical solution, such as is an etchant, from flowing into the color filter 230.

The passivation layer 180, the color filter 230, and the blocking layer 160 have a plurality of contact holes 185a and 185b respectively exposing the first and second drain electrodes 175a and 175b, and the passivation layer 180 and the blocking layer 160 have a plurality of contact holes 182a and 182b respectively exposing the end portions 179a and 179b of the first and second data lines 171a and 171b. The passivation layer 180, the blocking layer 160, and the gate insulating layer 140 have a plurality of contact holes 181 respectively exposing the end portions 129 of the gate lines 121.

A pixel electrode 191 and a plurality of contact assistants 81, 82a, and 82b are disposed on the passivation layer 180.

The pixel electrode 191 includes a pair of first and second sub-pixel electrodes 191a and 191b that are spaced apart from each other with a gap 91 therebetween. As shown FIG. 2 and FIG. 3, the first sub-pixel electrode 191a may have a quadrangular shape, and the second sub-pixel electrode 191b encloses the first sub-pixel electrode 191a with the gap 91 therebetween.

The gap 91 between the first sub-pixel electrode 191a and the second sub-pixel electrode 191b may have a quadrangular loop shape, and the above-described storage electrode 133 having a quadrangular loop shape overlaps the gap 91 and functions as a shielding member to block light leakage between the first sub-pixel electrode 191a and the second sub-pixel electrode 191b.

Also, the expansions 134a, 134b, 135a, and 135b of the storage electrode 133 function as shielding members to cover the texture caused by the light alignment, which will be described in detail below.

Further, the expansions 134a, 135a, 134b, and 135b of the storage electrode 133 overlap the first sub-pixel electrode 191a or the second sub-pixel electrode 191b to form a storage capacitor Cst.

That is to say, the first sub-pixel electrode 191a overlaps the expansions 134a and 135a of the storage electrode 133 to form the storage capacitor Csta. The openings 234a and 235a of the color filter 230 are disposed where the first sub-pixel electrode 191a and the expansions 134a and 135a of the storage electrode 133 overlap each other so that the thickness of the insulator of the storage capacitor Csta may be reduced, which may increase the storage capacitance.

The second sub-pixel electrode 191b overlaps the expansions 134b and 135b of the storage electrode 133 to form the storage capacitor Cstb. The openings 234b and 235b of the color filter 230 are disposed where the second sub-pixel electrode 191b and the expansions 134b and 135b of the storage electrode 133 overlap each other so that the thickness of the insulator of the storage capacitor Cstb may be reduced, which may increase the storage capacitance.

A first gate electrode 124a, a first protrusion 154a of the semiconductor stripe, a first source electrode 173a, and a first drain electrode 175a form a first thin film transistor Qa, and the first thin film transistor Qa is connected to the first sub-pixel electrode 191a via the contact hole 185a. A second gate electrode 124b, a second protrusion 154b of the semiconductor stripe, a second source electrode 173b, and a second drain electrode 175b form a second thin film transistor Qb, and the second thin film transistor Qb is connected to the second sub-pixel electrode 191b via the contact hole 185b.

In this way, the first sub-pixel electrode 191a and the second sub-pixel electrode 191b that form one pixel electrode 191 are respectively connected to the first thin film transistor Qa and to the second thin film transistor Qb so that the first and second sub-pixel electrodes 191a and 191b receive different data voltages through the first and second data lines 171a and 171b, respectively. Alternatively, the first and second sub-pixel electrodes 191a and 191b may receive separate data voltages through one data line at different times, or only the first sub-pixel electrode 191a may be connected to the thin film transistor while the second sub-pixel electrode 191b is capacitively coupled to the first sub-pixel electrode 191a so that only the first sub-pixel electrode 191a receives the data voltage and the second sub-pixel electrode 191b may have a changing voltage according to the change of a voltage of the first sub-pixel electrode 191a.

In this case, the area ratio of the first sub-pixel electrode 191*a* and the second sub-pixel electrode 191*b* deviates from about 1:1, and the second sub-pixel electrode 191*b* is larger than the first sub-pixel electrode 191*a*. The area ratio of the first sub-pixel electrode 191*a* and the second sub-pixel electrode 191*b* may be adjusted by regulating the height of the first sub-pixel electrode 191*a*. Here, the voltage of the first sub-pixel electrode 191*a* having a relatively small area is higher than the voltage of the second sub-pixel electrode 191*b* having the relatively large area.

In this way, since the voltages of the first sub-pixel electrode 191*a* and the second sub-pixel electrode 191*b* are different from each other, the voltages applied to the first LC capacitor Clca between the first sub-pixel electrode 191*a* and the common electrode 270 and the second LC capacitor Clcb between the second sub-pixel electrode 191*b* and the common electrode 270 differ from each other so that the tilt angle of the LC molecules in the first sub-pixel and the second sub-pixel differ from each other. As a result, the luminance of the two sub-pixels differs from each other. Accordingly, by adjusting the voltages of the first and second LC capacitors Clca and Clcb appropriately, the images shown at the side of the display may is approximate the image shown at the front, i.e., the gamma curve at the side of the display may be approximately close to the gamma curve at the front, thereby improving the side visibility.

The contact assistants 81, 82*a*, and 82*b* are connected with the end portion 129 of the gate line 121 and with the end portions 179*a* and 179*b* of the data lines 171*a* and 171*b* via the contact holes 181, 182*a*, and 182*b*, respectively. The contact assistants 81, 82*a*, and 82*b* complement adhesion of the end portion 129 of the gate line 121 and the end portions 179*a* and 179*b* of the data lines 171*a* and 171*b* with an external device, such as a driver IC, and protect the end portions 129, 179*a*, and 179*b*.

Next, the structure of the common electrode panel 200 will be described.

A light blocking member 220 is disposed on an insulating substrate 210; an overcoat 250 is disposed on the light blocking member 220, and a common electrode 270 is disposed on the overcoat 250.

Alignment layers 11 and 21 are respectively disposed on the facing surfaces of the thin film transistor array panel 100 and the common electrode panel 200. The alignment layers 11 and 21 are vertical alignment layers, and the surfaces of the alignment layers have end portions that are slanted in different directions according to regions.

An LC layer 3 is disposed between the thin film transistor array panel 100 and the common electrode panel 200. The LC layer 3 includes a plurality of LC molecules 310 having negative dielectric anisotropy.

Referring to FIG. 2 and FIG. 3, the part of the LC layer 3 disposed between the first sub-pixel electrode 191*a* and the common electrode 270 is referred to as a first LC layer and the part of the LC layer disposed between the second sub-pixel electrode 191*b* and the common electrode 270 is referred to as a second LC layer. The LC molecules 310 of the first LC layer and the second LC layer are aligned in four different directions as shown by the arrows. That is to say, each sub-pixel may include four domains having different alignment directions of the LC molecules, such as the left-upper direction, the left-lower direction, the right-upper direction, and the right-lower direction. Here, the tail of the arrow represents the long axis direction of the LC molecule 310 prior to alignment, that is to say, the vertical direction with the respect to the substrate, and the head of the arrow represents the alignment direction of the LC molecule 310. However, the number of the alignment directions of the LC molecules 310 may be three or less or five or more, if necessary.

Such domains may be formed by the light alignment method in which the light is irradiated onto the alignment layers 11 and 21. In the light alignment method, the light is obliquely irradiated onto the vertical alignment layer to align the light reactivity chains formed on the surfaces of the alignment layer surface in the direction of light irradiation, and when the light is obliquely irradiated in various directions, a plurality of domains may be formed.

Next, the light alignment method will be described with reference to FIG. 14, FIG. 15, FIG. 16, and FIG. 17.

Figure 14:
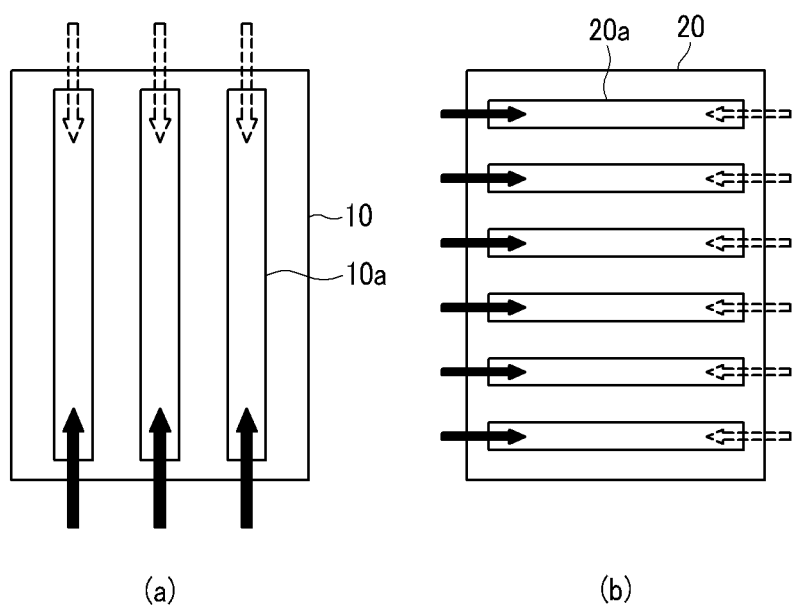
FIG. 14 is a schematic diagram showing two masks under light alignment.
Figure 15:
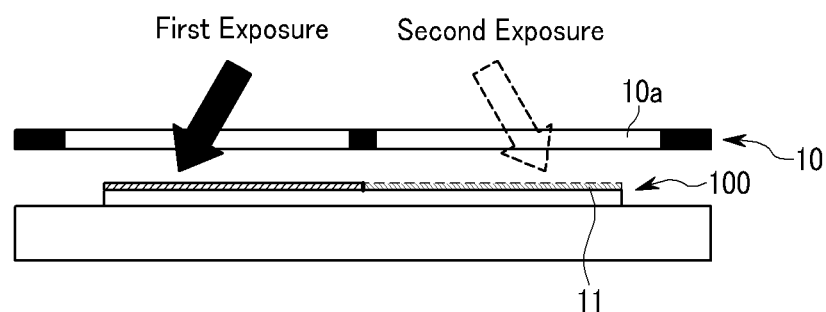
FIG. 15 is a schematic diagram showing a method for irradiating light using the masks shown in FIG. 14.
Figure 15:
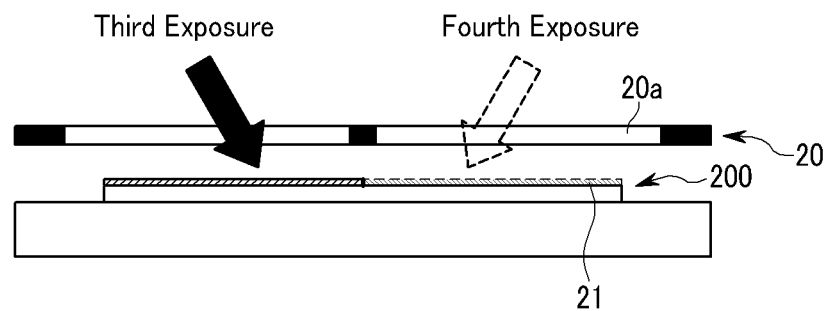
Figure 16:
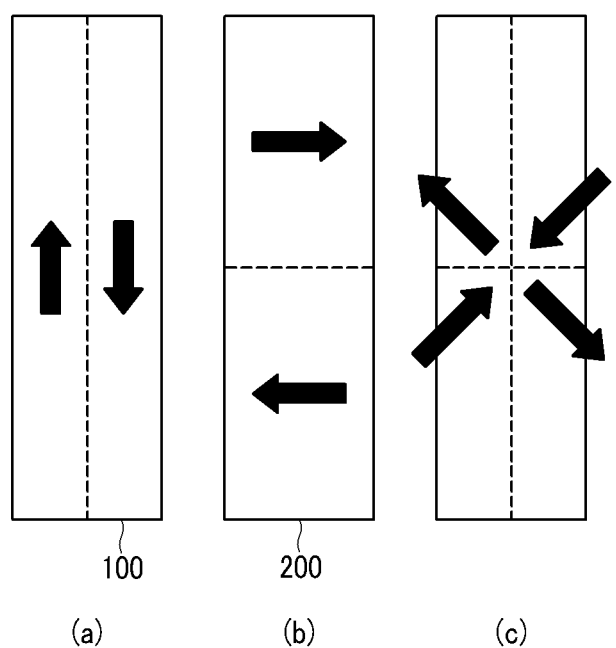
FIG. 16 and FIG. 17 are schematic diagrams showing the alignment of LC molecules subjected to the light alignment method.
Figure 17:
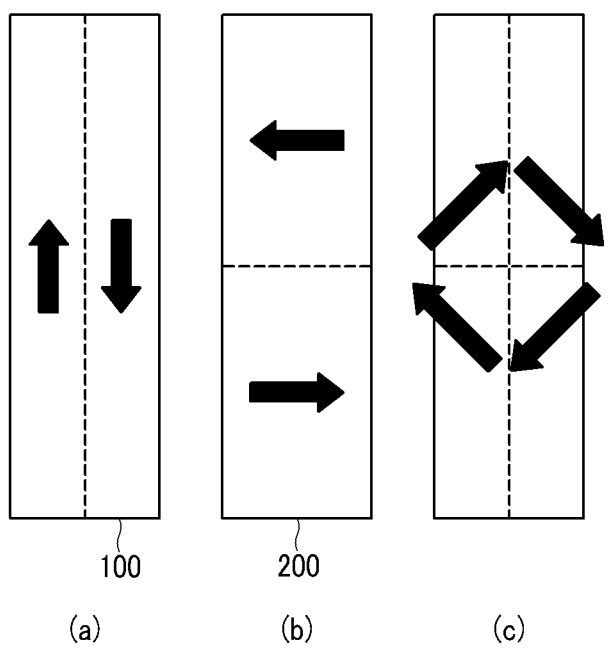

FIG. 14 is a schematic diagram showing two masks under light alignment; FIG. 15 is a schematic diagram showing a method for irradiating light by using the masks shown in FIG. 14, and FIG. 16 and FIG. 17 are schematic diagrams showing the alignment of LC molecules subjected to the light alignment method.

Referring to FIG. 14, a mask used under the light alignment may be a first mask 10 including a plurality of openings 10*a* parallel to the to the long edge of the substrate, or a second mask 20 including a plurality of openings 20*a* perpendicular to the long edge of the substrate.

Referring to FIG. 14 (*a*) and FIG. 15 (*a*), the first mask 10 is aligned on the thin film transistor array panel 100 coated with the alignment layer 11, and light, such as ultraviolet (UV) rays, is irradiated at an oblique angle to execute a first exposure. Next, the ultraviolet (UV) rays are obliquely irradiated in the direction opposite to the direction of the first exposure to execute a second exposure.

Here, the light irradiation is executed by moving along the direction parallel to the long axis of the openings 10*a* of the mask 10, that is to say, the upper and lower directions (arrow directions) in FIG. 14 (*a*). When the light irradiation is not executed by moving along the direction parallel to the long axis of the openings 10*a*, the region that is practically exposed may be reduced due to light diffraction, and also the process margin for the distance between the substrate and the mask and the exposing angle may be decreased. The method in which the light is obliquely irradiated onto the surface of the alignment layer may be performed by altering the angle of the substrate or the device for irradiating light.

For example, the left half portion of the pixel area may be irradiated by light having a declination angle from the lower side toward the upper side, and the right half portion of the pixel area may be irradiated by light having a declination angle from the upper side toward the lower side. Accordingly, as shown in FIG. 16 (*a*) and FIG. 17 (*a*), two regions having opposite tilt directions of LC molecules may be formed.

Similarly, referring to FIG. 14 (*b*) and FIG. 15 (*b*), the second mask 20 is aligned on the common electrode panel 200 coated with the alignment layer 21, and light, such as UV rays, is irradiated at an oblique angle to execute a third exposure. Next, the UV rays are obliquely irradiated in the direction opposite to the direction of the third exposure to execute a fourth exposure.

Here, the light irradiation is executed by moving along the direction parallel to the long axis of the openings 20*a* of the mask 20, that is to say, the right and left directions (arrow directions) in FIG. 14 (*b*). For example, the upper half portion of the pixel area may be irradiated by light having a declination angle from the left side toward the right side, and the lower half portion of the pixel area may be irradiated by light having a declination angle from the right side toward the left side, and accordingly, as shown in FIG. 16 (*b*), two regions having opposite tilt directions of LC molecules may be formed. Alternatively, the upper half portion of the pixel area may be irradiated by light having a declination angle from the right side toward the left side, and the lower half portion of the pixel area may be irradiated by light having a declination direction from the left side toward the right side, and accordingly, as shown in FIG. 17 (*b*), two regions having opposite tilt directions of LC molecules may be formed.

In this way, the same effect of rubbing the surface of the alignment layer in a uniform direction may be obtained by obliquely irradiating light with respect to the surface of the alignment layer. That is, the alignment direction of the surface of the alignment layer is decided according to the direction of light irradiation, so that a plurality of domains having various pre-tilt directions of the LC molecules may be formed by dividing one pixel into a plurality of regions and performing light exposure thereon.

Referring to FIG. 16 and FIG. 17, when assembling the thin film transistor array panel 100 having a left half portion and a right half portion that are irradiated in opposite directions to each other and the common electrode panel 200 having an upper half portion and a lower half portion that are irradiated in opposite directions to each other, as shown in FIG. 16 (*c*) and FIG. 17 (*c*), four domains that are respectively aligned in the left-lower direction, the left-upper direction, the right-lower direction, and the right-upper direction may be formed.

In an exemplary embodiment of the present invention, the light alignment method is used to form four domains having different alignment directions in each sub-pixel.

On the other hand, like the exemplary embodiment of the present invention, when one pixel includes two sub-pixels, the alignment directions of the LC molecules may be determined by the fringe field generated between the edges of the first sub-pixel electrode 191*a* and the second sub-pixel electrode 191*b* and the common electrode 270 near the gap 91 between the first sub-pixel electrode 191*a* and the second sub-pixel electrode 191*b*, in addition to the alignment directions of the light alignment. Therefore, because the alignment directions of the LC molecules determined by light alignment are different from the alignment directions of the LC molecules determined by the fringe field generated near the gap 91 between the two sub-pixels, texture due to the irregular arrangements of the LC molecules may be generated near the gap 91 between the two sub-pixel electrodes.

It was detected that texture was generated in a region where the LC molecules are declined toward the gap 91, that is, the region in which the heads of the arrows are positioned in FIG. 3. Referring to FIG. 3, the position where texture is generated in the present exemplary embodiment is the left-upper portion and the right-lower portion of the first sub-pixel electrode 191*a* and the right-upper portion and the left-lower portion of the second sub-pixel electrode 191*b*.

Accordingly, as shown in FIG. 2, in an exemplary embodiment of the present invention, the storage electrode 133, which acts as a shielding member, covers the left-upper portion and the right-lower portion of the first sub-pixel electrode 191*a*, the right-upper portion and the left-lower portion of the second sub-pixel electrode 191*b*, and the circumference of the gap 91 to cover the textures. Accordingly, the transmittance may be improved, and the texture is may be prevented from being shown as a spot from outside, thereby improving the display characteristics.

In the present exemplary embodiment, the storage electrode, which acts as a shielding member, is disposed on the same layer as the gate line, but it is not limited thereto and may be disposed on the same layer as the data line. Further, when the storage electrode functions only as a shielding member, it may not be disposed on the same layer as the gate line or the data line but may be disposed on the same layer as the light blocking member 220 of the common electrode panel 200. Also, the light blocking member 220 may be disposed on the thin film transistor array panel 100 when the storage electrode is disposed on the same layer as the light blocking member.

Exemplary Embodiment 2

Next, another exemplary embodiment of the present invention will be described in detail with reference to FIG. 6, FIG. 7, FIG. 8, and FIG. 9. Descriptions overlapping the previous exemplary embodiment are omitted, and the same constituent elements are indicated by the same reference numerals.

Figure 6:
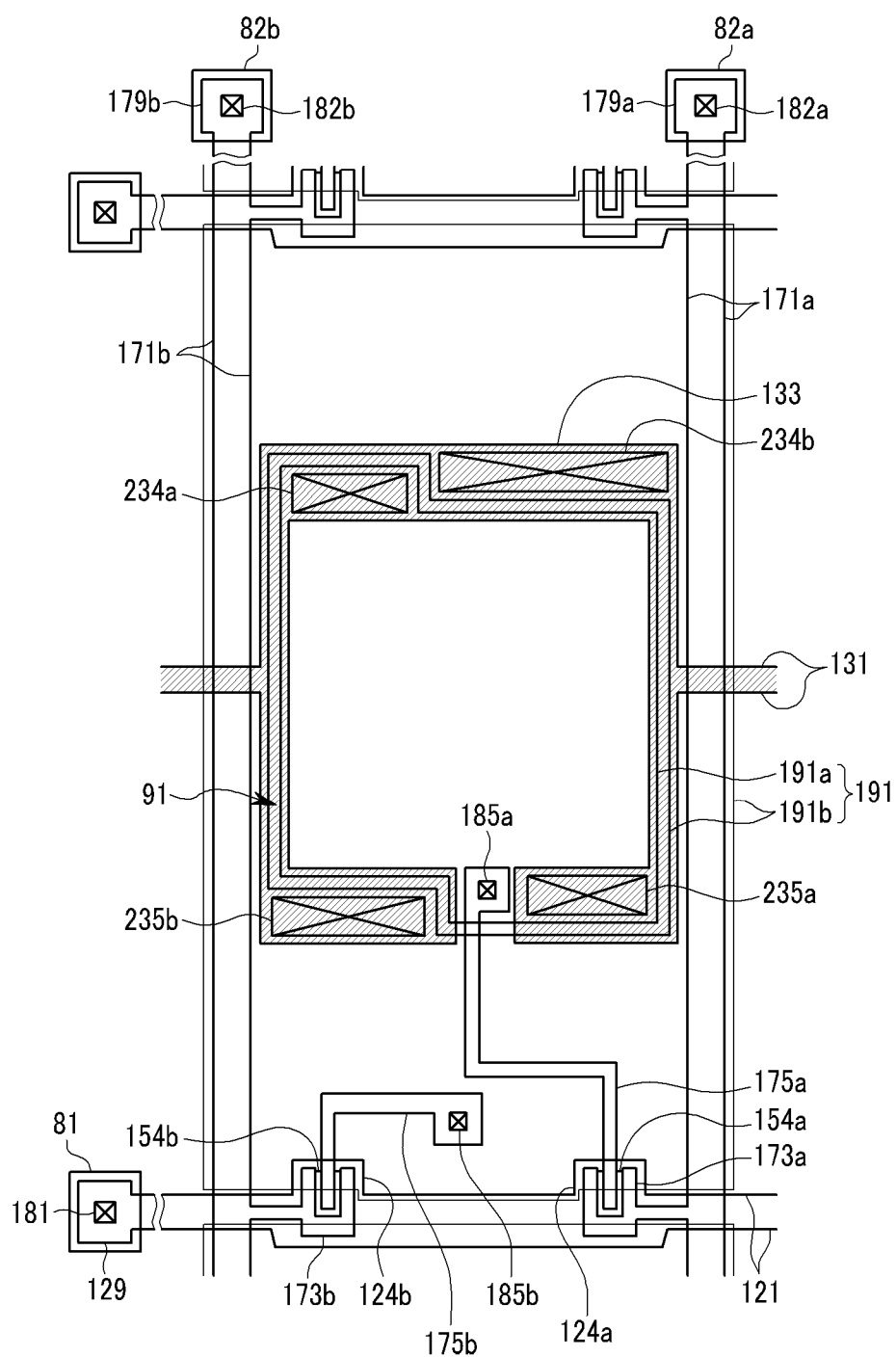
FIG. 6 is a layout view of an LCD according to another exemplary embodiment of the present invention.
Figure 7:
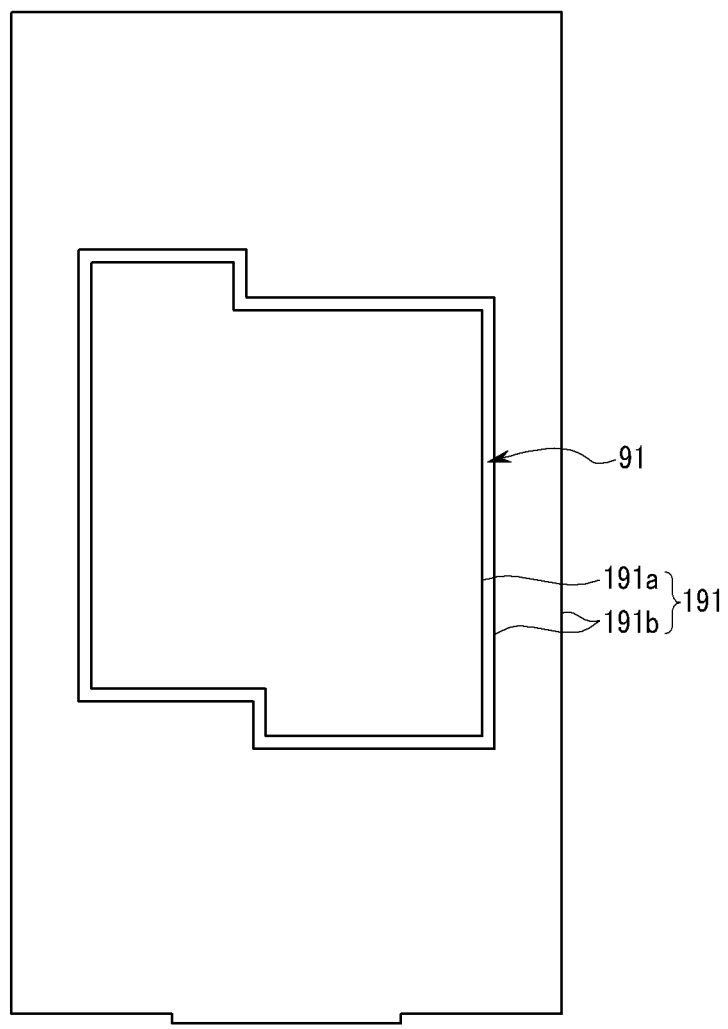
FIG. 7 and FIG. 8 are layout views respectively showing a pixel electrode and a gate conductor in the LCD of FIG. 6.
Figure 8:
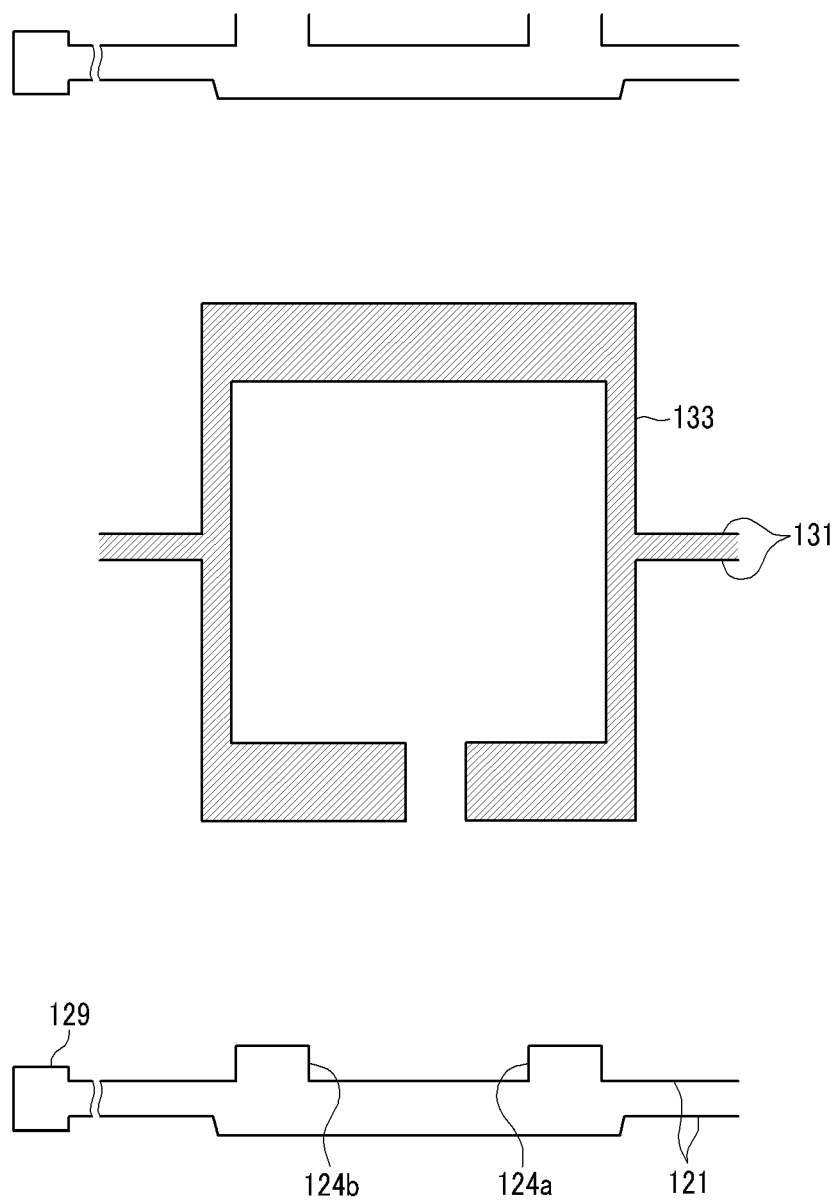
Figure 9:
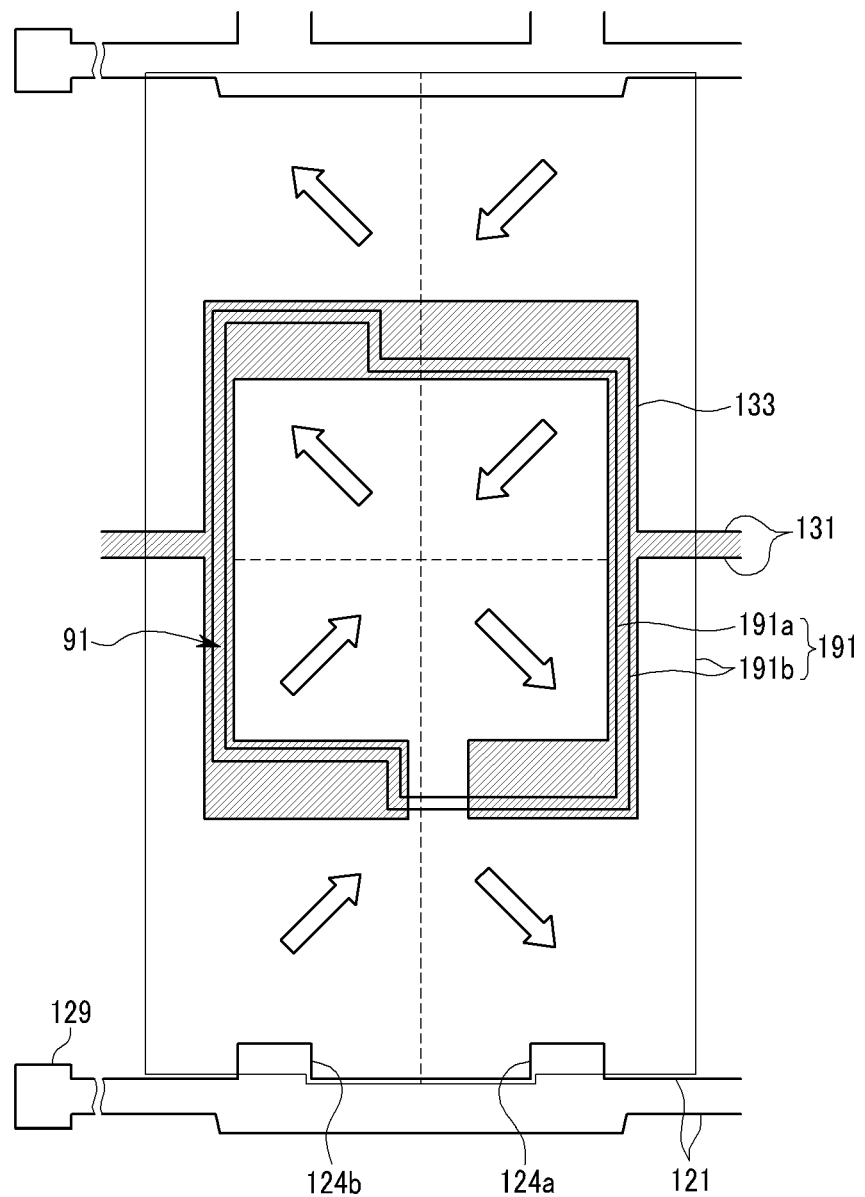
FIG. 9 is a layout view showing a pixel electrode, a gate conductor, and the alignment direction of LC molecules of FIG. 6.

FIG. 6 is a layout view of an LCD according to another exemplary embodiment of the present invention, and FIG. 7, FIG. 8, and FIG. 9 are layout views showing a pixel electrode and a gate conductor in the LCD of FIG. 6.

The present exemplary embodiment includes a thin film transistor array panel 100 and a common electrode panel 200, and an LC layer 3 formed therebetween, as in the previously-described exemplary embodiment.

The deposited structures of the thin film transistor array panel 100 and the common electrode panel 200 are the same as those of the previously-described exemplary embodiment, but the present exemplary embodiment includes a pixel electrode 191 and a storage electrode 133 having different shapes from those of the previously-described exemplary embodiment.

Referring to FIG. 6 and FIG. 7, the pixel electrode 191 according to the present exemplary embodiment includes a pair of first and second sub-pixel electrodes 191*a* and 191*b* that are divided with a gap 91 therebetween.

The upper edge and the lower edge of the first sub-pixel electrode 191*a* have a stair shape. In detail, the left-upper portion of the first sub-pixel electrode 191*a* extends upward and the right-lower portion extends downward. The second sub-pixel electrode 191*b* encloses the first sub-pixel electrode 191*a*.

Referring to FIG. 6 and FIG. 8, the storage electrode 133 has a quadrangular loop shape including an upper portion, a lower portion, a left portion, and a right portion. The upper portion, the lower portion, the left portion, and the right portion of the storage electrode 133 respectively have uniform widths not including the portions extending upward or downward differently from the previously-described exemplary embodiment. The upper and lower portions of the storage electrode 133 are wider than the left and right portions, and a part of the lower portion is omitted.

Referring to FIG. 6 and FIG. 9, the storage electrode 133 functions as a shielding member to block light leakage between the first sub-pixel electrode 191*a* and the second sub-pixel electrode 191*b* at the gap 91 between the first sub-pixel electrode 191*a* and the second sub-pixel electrode 191*b*.

Also, the upper portion and the lower portion of the storage electrode 133 cover the upper and lower edges of the first sub-pixel electrode 191*a* having a stair shape so that they is function as a shielding member to cover texture generated in this region.

As in the previously-described exemplary embodiment, when the part of the LC layer disposed between the first sub-pixel electrode 191*a* and the common electrode 270 is referred to as a first LC layer and the part of the LC layer disposed between the second sub-pixel electrode 191*b* and the common electrode 270 is referred to as a second LC layer, the LC molecules 310 of the first LC layer and the second LC layer are aligned in four different directions as shown by the arrows. That is to say, each sub-pixel may include four domains having different alignment directions of the LC molecules, such as the left-upper direction, the left-lower direction, the right-upper direction, and the right-lower direction. Such domains may be formed by the light alignment method as described above.

As described above, texture is generated in a region where the direction that the LC molecules are declined toward the gap 91, that is to say, the left-upper portion and the right-lower portion of the first sub-pixel electrode 191a and the right-upper portion and the left-lower portion of the second sub-pixel electrode 191b, where the heads of the arrows are positioned as in FIG. 9.

In the present exemplary embodiment, the left-upper portion and the right-lower portion of the first sub-pixel electrode 191a in which the texture is generated are extended, and the extended portions are covered by the storage electrode having a quadrangular loop shape to effectively cover the texture.

In this structure, it may be easy to control the area ratio of the openings 234a, 234b, 235a, and 235b of the color filter 230 so that asymmetry of viewing angle characteristics may be prevented; the transmittance may be increased, and display characteristics may be improved by appropriately covering the texture. Also, the aperture ratio may be improved as is compared with the previously-described exemplary embodiment.

Exemplary Embodiment 3

Figure 11:
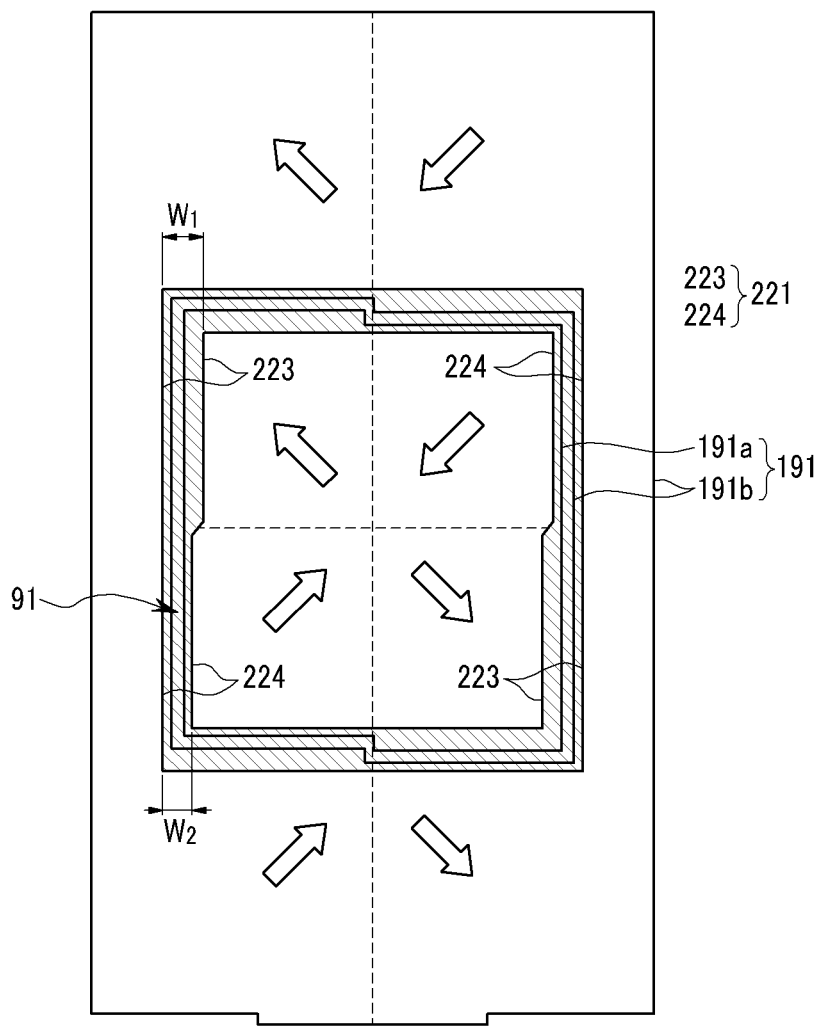
FIG. 11 is a schematic diagram showing a pixel electrode and a shielding member in the LCD of FIG. 10.
Figure 12:
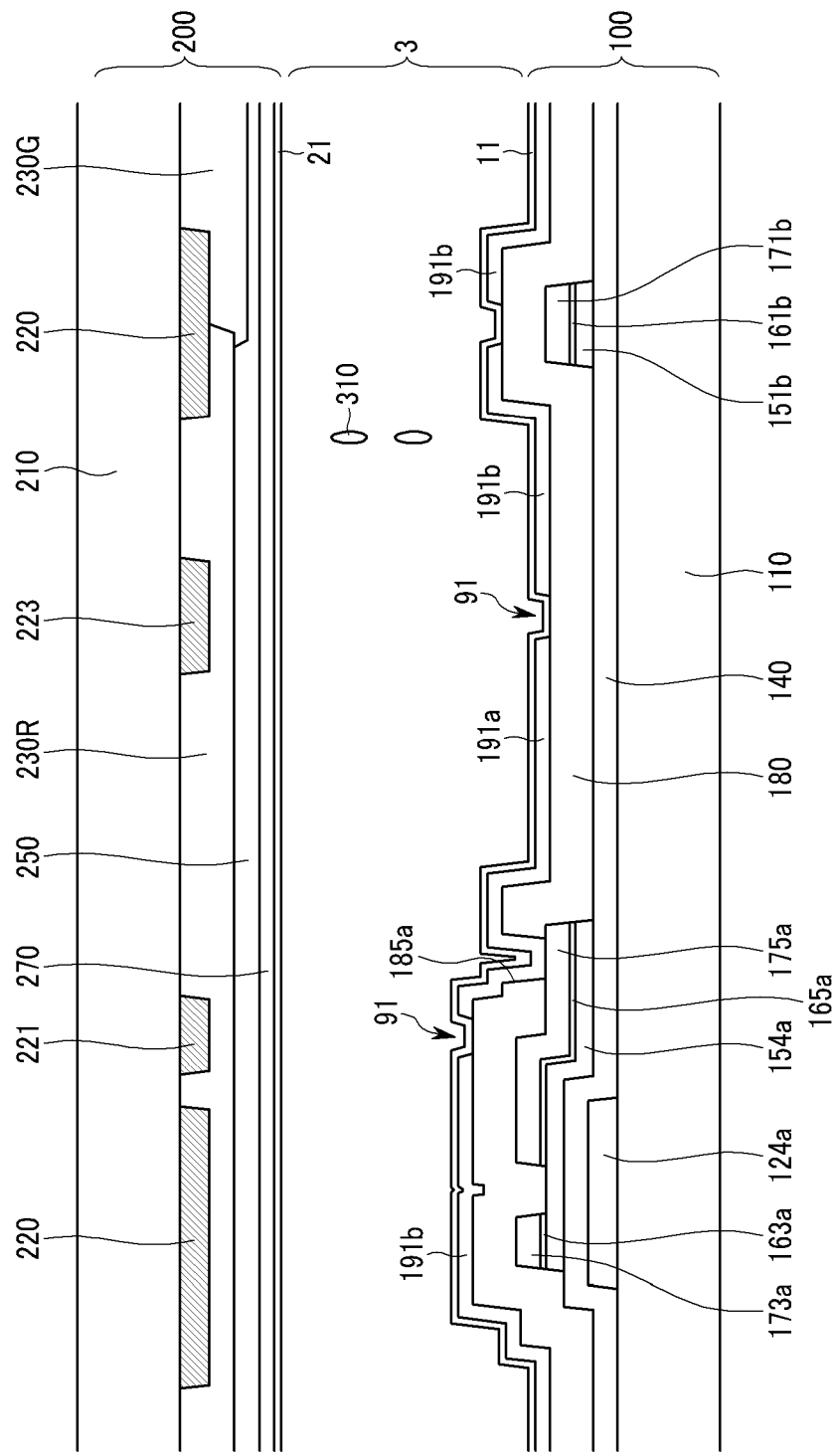
FIG. 12 is a cross-sectional view of the LCD taken along line XII-XII of FIG. 10.

Next, another exemplary embodiment of the present invention will be described in detail with reference to FIG. 10, FIG. 11, and FIG. 12. Descriptions overlapping the previous exemplary embodiments are omitted, and the same constituent elements are indicated by the same reference numerals.

Figure 10:
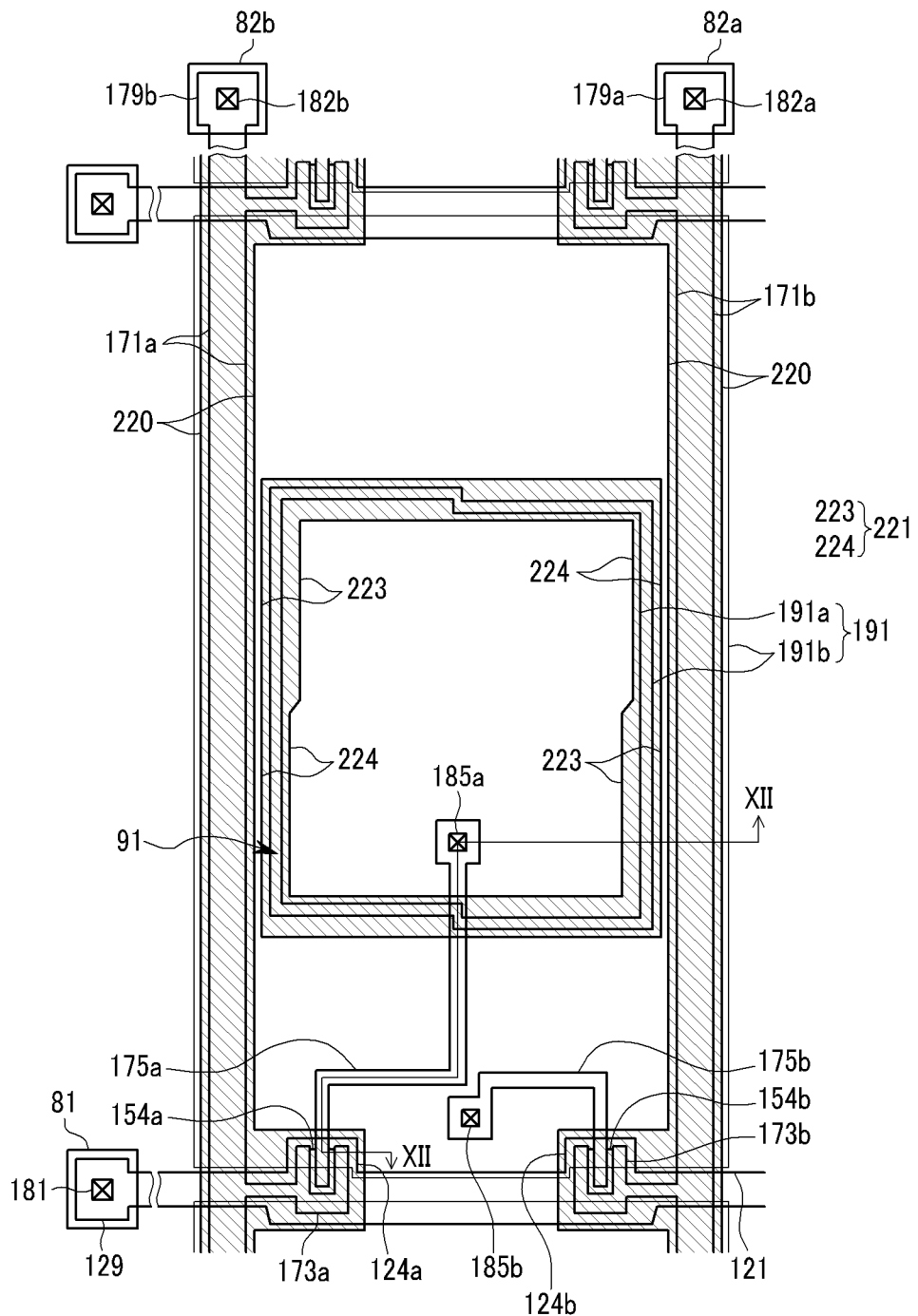
FIG. 10 is a layout view of an LCD according to another exemplary embodiment of the present invention.

FIG. 10 is a layout view of an LCD according to another exemplary embodiment of the present invention; FIG. 11 is a schematic diagram showing a pixel electrode and a shielding member in the LCD of FIG. 10, and FIG. 12 is a cross-sectional view taken along line XII-XII of FIG. 10.

The present exemplary embodiment includes a thin film transistor array panel 100 and a common electrode panel 200, and an LC layer 3 disposed therebetween, as in the previously-described exemplary embodiment.

The deposition structures of the thin film transistor array panel 100 and the common electrode panel 200 are almost the same as those of the previous exemplary embodiment, but the color filter 230 is disposed on the common electrode panel 200 in the present exemplary embodiment. Also, the storage electrode line 131 of the previous exemplary embodiment is omitted in the present exemplary embodiment, and instead, a shielding member 221 overlapping the gap 91 between the first sub-pixel electrode 191a and the second sub-pixel electrode 191b is included in the common electrode panel 200.

First, in the thin film transistor array panel 100, a gate line 121 including first and second gate electrodes 124a and 124b and a wide end portion 129 is disposed on an insulating substrate 110, and a gate insulating layer 140 is disposed on the gate line 121.

A semiconductor stripe 151b including first and second protrusions 154a and 154b is disposed on the gate insulating layer 140, and an ohmic contact stripe 161b, a first ohmic contact island 165a, and a second ohmic contact island (not shown) are disposed thereon.

A plurality of first and second data lines 171a and 171b and a plurality of pairs of first and second drain electrodes 175a and 175b are disposed on the ohmic contact stripe and the gate insulating layer 140, and a passivation layer 180 is disposed thereon. The passivation layer 180 has a plurality of contact holes 185a, 185b, 182a, and 182b respectively exposing the first and second drain electrodes 175a and 175b and the end portions 179a and 179b of the first and second data lines 171a and 171b, and the passivation layer 180 and the gate insulating layer 140 have contact holes 181 exposing the end portions 129 of the gate lines 121.

A pixel electrode 191 and a plurality of contact assistants 81, 82a, and 82b are disposed on the passivation layer 180.

The pixel electrode 191 includes a pair of the first and second sub-pixel electrodes 191a and 191b that are spaced apart with a gap 91 therebetween. The upper and lower edges of the first sub-pixel electrode 191a may have a stair shape. In detail, the left-upper portion of the first sub-pixel electrode 191a extends upward and the right-lower portion extends downward. The second sub-pixel electrode 191b encloses the first sub-pixel electrode 191a.

Next, the common electrode panel 200 will be described.

A plurality of light blocking members 220 and a plurality of shielding members 221 are disposed on an insulating substrate 210. The light blocking member 220 includes a straight portion corresponding to the data line 171 and expansions corresponding to the thin film transistors. Each shielding member 221 has a quadrangular loop shape including an upper portion, a lower portion, a right portion, and a left portion and sufficiently covers the gap is between the first sub-pixel electrode 191a and the second sub-pixel electrode 191b and the stair-shaped portion of the first sub-pixel electrode 191a.

The left and right portions of the shielding member 221 respectively include a wide portion 223 and a narrow portion 224. Here, referring to FIG. 11, the width W1 of the wide portion 223 is wider than the width W2 of the narrow portion 224 by about 4 to 7 μm. In this way, the wide portion 223 may effectively cover the texture generated in the vertical direction near the gap 91 between the first pixel electrode 191a and the second pixel electrode 191b.

Color filters 230R and 230G are disposed on the light blocking member 220 and the shielding member 221, and an overcoat 250 and a common electrode 270 are disposed on the color filters 230R and 230G.

Alignment layers 11 and 21 are disposed on the facing surfaces of the thin film transistor array panel 100 and the common electrode panel 200, respectively, and the alignment layers 11 and 21 have portions that are slanted in various directions by the light alignment method.

An LC layer 3, in which LC molecules 310 are aligned in various directions, is disposed between the thin film transistor array panel 100 and the common electrode panel 200.

Exemplary Embodiment 4

Next, another exemplary embodiment of the present invention will be described in detail with reference to FIG. 13.

Figure 13:
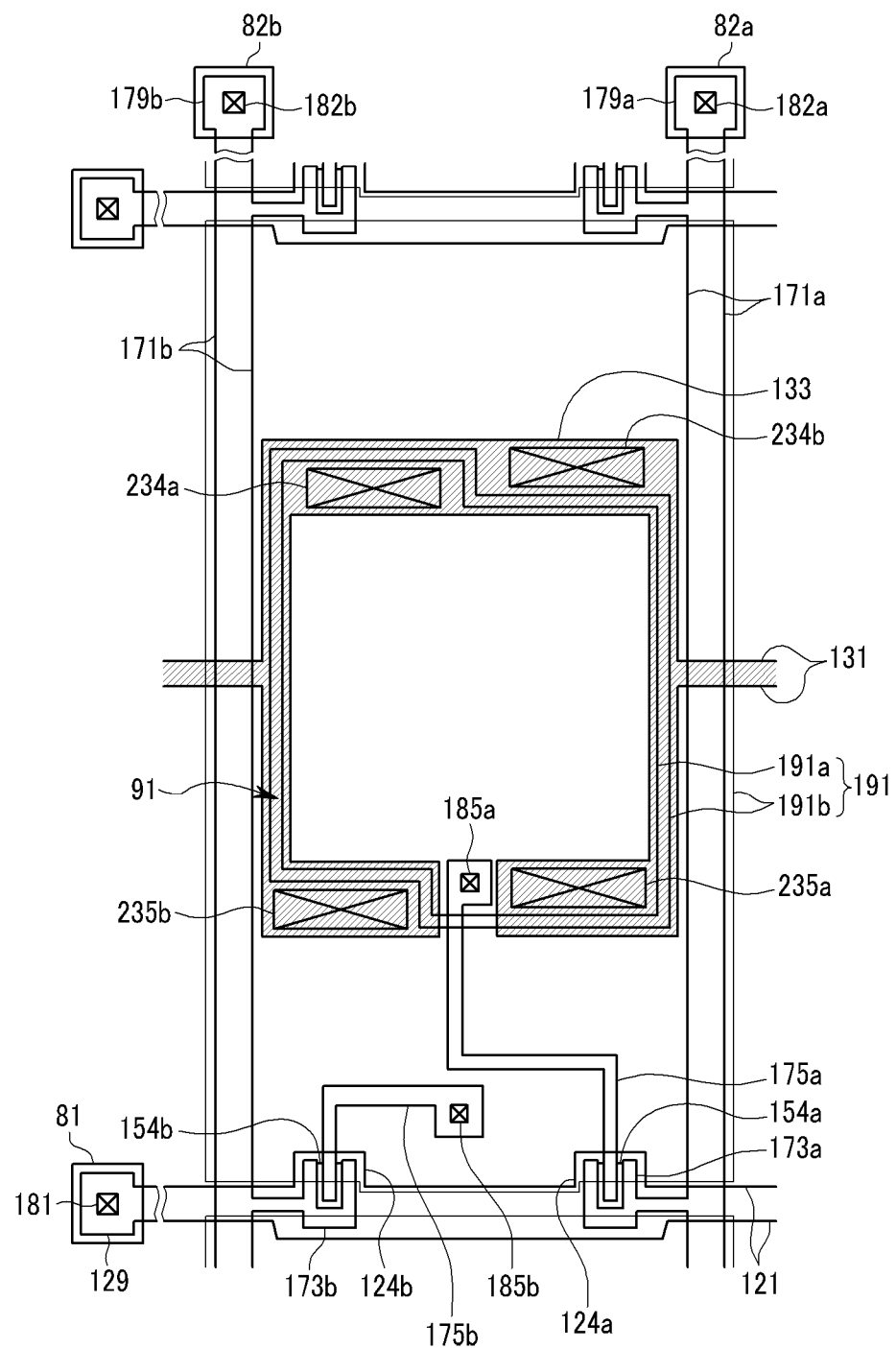
FIG. 13 is a layout view of an LCD according to another exemplary embodiment of the present invention.

FIG. 13 is a layout view of an LCD according to another exemplary embodiment of the present invention.

The present exemplary embodiment is almost the same as the Exemplary Embodiment 2, but the stair-shaped portion of the upper edge of the first sub-pixel electrode 191a aligns with the vertical center line of the second sub-pixel electrode 191b. In this way, because the stair-shaped portion of the upper edge of the first sub-pixel electrode 191a aligns with the vertical center line of the second sub-pixel electrode 191b, the texture generated due to the asymmetry may be covered effectively.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display, comprising:
    a first substrate and a second substrate facing each other;
    a pixel electrode disposed on the first substrate and comprising a first sub pixel electrode and a second sub pixel electrode being paired with each other to form a pixel;
    an alignment layer disposed on at least one of the first substrate and the second substrate and comprising a plurality of chains made from a light reactive material;
    a liquid crystal layer disposed between the first substrate and the second substrate and comprising liquid crystal molecules to be aligned in a plurality of directions; and
    a conductive line disposed on the first substrate,
    wherein the first sub pixel electrode has a first edge portion and a second edge portion opposite the first edge portion, and the first edge portion comprises a first section and a second section, liquid crystal molecules of the first section to be aligned in a different direction from those of the second section,
    wherein the conductive line comprises a first segment and a second segment that extend along the first section and the second section of the first edge portion, respectively, and the first segment overlaps the first section of which liquid crystal molecules are oriented toward the first edge portion,
    wherein a tilt angle of the liquid crystal molecules on the first sub pixel electrode and a tilt angle of the liquid crystal molecules on the second sub pixel electrode are different from each other when an electric field is generated in the liquid crystal layer,
    wherein the first sub-pixel electrode is electrically connected to a first thin film transistor, and the second sub-pixel electrode is electrically connected to a second thin film transistor,
    wherein the first sub-pixel electrode has a size different from the second sub-pixel electrode, and
    wherein a distance from the first segment to the second edge portion is smaller than a distance from the second segment to the second edge portion.

2. The liquid crystal display of claim 1, wherein a voltage of the first sub pixel electrode and a voltage of the second sub pixel electrode are different from each other.

3. The liquid crystal display of claim 1, further comprising a common electrode disposed on the second substrate.

4. The liquid crystal display of claim 1, wherein a liquid crystal capacitance formed between the first sub pixel electrode and the common electrode is different from a liquid crystal capacitance formed between the second sub pixel electrode and the common electrode.

5. The liquid crystal display of claim 1, wherein alignment directions of liquid crystal molecules positioned between the first sub pixel and the second substrate are oriented toward the first section and away from the second section.

6. The liquid crystal display of claim 1, wherein the second edge portion comprises a first section and a second section, and wherein the first section of the first edge portion is disposed opposite the second section of the second edge portion, and the second section of the first edge portion is disposed opposite the first section of the second edge portion.

7. The liquid crystal display of claim 6, wherein the second sub pixel electrode has a first edge portion and a second edge portion opposite the first edge portion of the second sub pixel, the first edge portion and the second edge portion of the second sub pixel both comprise a first section and a second section, and a width of the first section of the second sub pixel overlapping the conductive line is greater than a width of the second section of the second sub pixel overlapping the conductive line.

8. The liquid crystal display of claim 7, wherein alignment directions of liquid crystal molecules positioned between the second sub pixel and the second substrate are oriented toward the first section and away from the second section of the second sub pixel.

9. The liquid crystal display of claim 1, further comprising an insulating layer comprising a contact hole, wherein the first thin film transistor comprises a drain electrode, and the first sub pixel electrode is connected to the drain electrode through the contact hole.

10. The liquid crystal display of claim 9, wherein the contact hole is disposed on a border of two regions of which alignment directions of liquid crystal molecules are different from each other.

11. The liquid crystal display of claim 10, further comprising a gate line connected to the first thin film transistor and the second thin film transistor, wherein the drain electrode extends from the gate line to the contact hole and has a first portion perpendicular to the gate line and a second portion parallel with the gate line.

12. The liquid crystal display of claim 11, wherein the drain electrode has two bends.

13. The liquid crystal display of claim 1, wherein the alignment directions of the liquid crystal molecules make an angle with respect to edges of the conductive line ranging from between 0° and 90°.

14. The liquid crystal display of claim 1, wherein the first sub pixel electrode and the second sub pixel electrode each comprise four domains.

15. The liquid crystal display of claim 1, further comprising a first data line connected to the first transistor and a second data line connected to the second transistor.

16. The liquid crystal display of claim 1, wherein the conductive line is at least one of storage electrode lines.

17. The liquid crystal display of claim 16, wherein the conductive line comprises a first portion and a second portion which is wider than the first portion.

18. The liquid crystal display of claim 16, wherein the conductive line comprises a stepped portion.

19. The liquid crystal display of claim 1, wherein the conductive line is disposed on the second substrate.

20. The liquid crystal display of claim 19, wherein the conductive line comprises a first portion and a second portion which is wider than the first portion.

* * * * *